(12) United States Patent
Funamoto et al.

(10) Patent No.: US 6,582,091 B2
(45) Date of Patent: Jun. 24, 2003

(54) ILLUMINATION DEVICE

(75) Inventors: Tatsuaki Funamoto, Chino (JP); Masahiro Uchida, Fujimi-machi (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/791,580

(22) Filed: Feb. 26, 2001

(65) Prior Publication Data

US 2001/0033482 A1 Oct. 25, 2001

(30) Foreign Application Priority Data

| Feb. 24, 2000 | (JP) | ................................ 2000-048042 |
| Feb. 25, 2000 | (JP) | ................................ 2000-050163 |
| Jan. 10, 2001 | (JP) | ................................ 2001-003024 |

(51) Int. Cl.⁷ ............................................. F21V 9/16
(52) U.S. Cl. ........................... 362/31; 362/26; 349/65
(58) Field of Search ........................ 362/31, 84, 231, 362/230, 558, 26, 561, 27; 349/65, 69; 313/504

(56) References Cited

U.S. PATENT DOCUMENTS 5,751,386 A * 5/1998 Kanda et al. ................ 349/65
6,288,761 B1 * 9/2001 Kanatsu ....................... 349/65
6,195,142 B1 * 2/2002 Gyotoku et al. ............. 349/69

FOREIGN PATENT DOCUMENTS

| JP | A 9-197133 | 7/1997 | |
| JP | 09-197133 | * 7/1997 | ............ G02B/6/00 |
| JP | A-10-50124 | 2/1998 | |
| JP | 10-50124 | * 2/1998 | ............ G02F/1/133 |

* cited by examiner

*Primary Examiner*—Stephen Husar
*Assistant Examiner*—Bao Truong
(74) *Attorney, Agent, or Firm*—Oliff & Berridge, PLC.

(57) ABSTRACT

A front-end surface illumination device is provided which is high in visibility when it is illuminated or not, low in power consumption, and compact. When a light beam emitted from an organic electroluminescence element formed on an end face of a light transmission plate reaches projecting portions, the light is emitted from the light transmission plate, and irradiated on an illuminated object. In this constitution, the light transmission plate has the function of projecting the light beam to the illuminated object, and transmitting the light beam reflected by the illuminated object with little diffusion.

16 Claims, 6 Drawing Sheets

ILLUMINATION DEVICE

BACKGROUND OF THE INVENTION

1. Field of Invention

The present invention relates to an illumination device. More specifically, the present invention relates to a low profile surface illumination device to illuminate an illuminated object such as an image printed on a paper, a liquid crystal display device, and a three-dimensional body.

2. Description of Related Art

Hitherto, a related illumination device disposed on a front side of, for example, a liquid crystal display device described in Japanese Unexamined Patent Application Publication No. 10-50124, Official Gazette is known. In the illumination device described in the Official Gazette, a light source part 404 having a linearly formed organic electroluminescence (organic EL) element 402 is disposed adjacent to an end face portion of a light guide plate 401 to illuminate an illuminated object 403, as shown in FIG. 14.

SUMMARY OF THE INVENTION

The light source part of the above-described illumination device consists of a separate component, and is coupled with or adjacently disposed on an end face of a light transmission plate. Thus, there have been problems at least in that the loss in the light transmission can be generated at an interface, the parts having the organic EL element formed thereon and the light transmission plate must be dimensionally affordable, and a spatial loss can be generated. Accordingly, a structure for coupling the light source part with the light guide plate may be necessary.

Further, there have been problems with a prior art illumination device in that a plurality of organic EL elements must be built in one light source, and a fine structure must be machined. Thus, the process is complicated and the yield is difficult to improve.

Accordingly, the object of the present invention is to at least solve these problems and to provide an illumination device high in efficiency and suitable for reduction in size by forming the organic EL elements on the light guide plate or allowing the light to be incident thereon from a plurality of directions of the light guide plate.

An illumination device according to one exemplary embodiment of the present invention is an illumination device which includes a transparent light guide plate and a light source provided adjacent to the above-described light guide plate, and which illuminates an illuminated object by the light emitted from the above-described light guide plate. The above-described light source is an organic electroluminescence element formed on at least one surface of a light emission side main surface and a counter light emission side main surface of the above-described light guide plate. The transmission loss can be reduced by integratedly forming a light guide plate part with a light source part.

In an illumination device according to another exemplary embodiment of the present invention, uneven-shaped portions for light diffusion are provided on the above-described light guide plate in the illumination device described above. The light from the above-described light source transmits in the above-described light guide plate, is diffused in a part of the above-described uneven-shaped portions, and illuminates the above-described illuminated object. The reflected light from the above-described illuminated object transmits in the above-described light guide plate, and is emitted therefrom. The illumination efficiency can be increased by providing the uneven-shaped portions.

In an illumination device according to another exemplary embodiment of the present invention, the illumination device described above further includes a light reflecting part provided on an end face of the above-described light guide plate. The light which is emitted from the end face but does not contribute to the illumination out of the light emitted from the organic EL element can be reduced.

In an illumination device according to another exemplary embodiment of the present invention, the above-described uneven-shaped portion includes a light emission side main surface of the above-described light guide plate, a surface substantially parallel to the light emission side main surface, and a surface substantially perpendicular to the light emission side main surface in the illumination device described above. The light emitted from the light guide plate can be deflected to one side, and illumination can be realized without damaging an image on the illuminated object.

In an illumination device according to another exemplary embodiment of the present invention, the above-described illuminated object is a display device in one of the illumination devices described above, and a front side of its display surface is illuminated. An illumination device of a so-called front light system can be realized thereby.

An illumination device according to another exemplary embodiment of the present invention is an illumination device which includes a transparent light guide plate and a light source provided on the above-described light guide plate, and illuminates an illuminated object by the light emitted from the above-described light guide plate. The above-described light source may include an organic electroluminescence element, and provided on at least one of a plurality of end parts on a main surface of the above-described light guide plate.

In an illumination device according to another exemplary embodiment of the present invention, the above-described light sources different in light emitting color from each other are disposed on at least two end parts out of a plurality of above-described end parts in the illumination device described above. In this constitution, the light sources can be individually manufactured, and the efficiency and the yield can be improved.

In an illumination device according to another exemplary embodiment of the present invention, the main surface of the above-described light guide plate is substantially rectangular, and the above-described light sources of the same light emitting color are respectively disposed on the end parts opposite thereto in the illumination device described above. The uniformity of the light emitting color can be improved by setting the same light emitting color of the organic EL elements opposite to each other.

In an illumination device according to another exemplary embodiment of the present invention, the above-described light sources of three colors different in light emitting color are respectively disposed on a plurality of end parts of both main surfaces of the above-described light guide plate in the illumination device described above. A white light can be easily obtained by mixing the lights in the light guide plate if three light emitting colors of the light sources are red, green and blue.

In an illumination device according to another exemplary embodiment of the present invention, a plurality of light sources different in light emitting color from each other are provided on the above-described end parts in one of the illumination devices described above.

In an illumination device according to another exemplary embodiment of the present invention, a transparent electrode for driving the light source is provided in the vicinity of an end part on which the above-described light source is provided in the main surface of the above-described light guide plate in one of the illumination devices described above. No transparent electrode is provided on a center portion of the light guide plate, and the transmissivity and the reflectance can be improved.

In an illumination device according to another exemplary embodiment of the present invention, the above-described light guide plate further includes uneven-shaped portions for light diffusion provided on at least one of the above-described main surfaces, and a transparent electrode for driving the light source provided so as to cover the above-described uneven-shaped portions in one of the illumination devices described above. The surface resistance of the transparent electrode can be reduced, and the uniform light emission can be realized.

In an illumination device according to another exemplary embodiment of the present invention, the illumination device described above further includes an auxiliary electrode which is provided in an area other than the area having the above-described uneven-shaped portions, and electrically connected to the above-described transparent electrode to supply the power to the transparent electrode. The organic EL element can be driven more stably by providing the auxiliary electrode on a part not influential on the illumination effect.

In an illumination device according to another exemplary embodiment of the present invention, the above-described illuminated object is a display device and a reverse side of its display surface is illuminated in one of the illumination devices described above. An illumination device of the so-called back light system can be realized thereby.

BRIEF DESCRIPTION OF THE DRAWINGS

FIG. 9(a) is a face side view and FIG. 9(b) is a reverse side view;

FIG. 13(a) is a sectional view and FIG. 13(b) is a reverse side view.

DETAILED DESCRIPTION OF PREFERRED EMBODIMENTS

Figure 1:
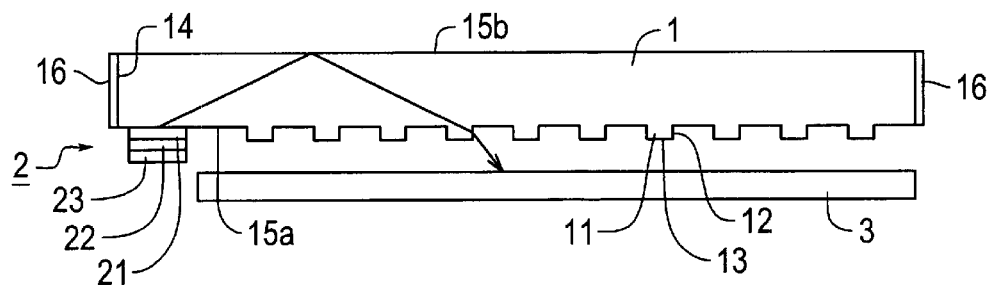
FIG. 1 is a sectional view of a structure of an illumination device according to a first exemplary embodiment of the present invention.

The embodiment of the present invention will be further described with reference to the drawings. In the drawings to be referred to in the following description, equivalent parts to those in other drawings are indicated by the same symbols.

First Exemplary Embodiment

A first exemplary embodiment of the present invention is described below with reference to the drawings. FIG. 1 is a sectional view showing the constitution of an illumination device of the first embodiment of the present invention. In the figure, a light transmission plate 1 is a transparent plate-like member. An organic EL element 2 is formed on an end part of a plate surface 15a which is a main surface of this light transmission plate 1. The organic EL element 2 may consist of a transparent electrode film 21, a light-emitting layer 22 and a reflecting electrode film 23 formed in order from the light transmission plate 1 side. Though the light-emitting layer 22 is depicted in a simplified manner, it may actually consist of a plurality of layers including a hole transport layer, an organic EL light emitting film, and an electron transport layer.

A projecting portion 11 having an uneven shape for light diffusion is provided on one plate surface 15a of the light transmission plate 1. This projecting portion 11 may consist of a side surface 12 perpendicular to the plate surface 15a of, for example, the light transmission plate 1, and a bottom surface 13 parallel to the plate surface 15a. In the figure, the path of an arbitrary light beam in the light guide plate 1 is indicated by an arrow. When the light beam emitted from the organic EL element 2 reaches a plate surface 15b of the light transmission plate 1 at the angle of not less than the critical angle, the light beam is subjected to the total reflection, and transmits in the light transmission plate, and can be outside the light transmission plate 1 when this beam reaches a side surface 12 of the projecting portion 11 at the angle of not more than the critical angle. This means that more light is emitted from a reverse side of the illumination device, and an illuminated object 3 can be effectively illuminated.

A reflecting film 16 is disposed adjacent to an end face 14 of the light transmission plate 1. The light beam reaching a plate surface 15 of the light guide plate 1 at the angle not more than the critical angle out of the light beam emitted from the organic EL element 2 does not contribute to the light transmission, and the ratio of this light beam is about 20% of the total. About one half of the remaining light beam transmits in the direction where the projecting portion 11 formed on the plate surface 15 is present, and the remaining half of the remaining light beam transmits in the direction opposite thereto. This is reflected by the reflecting film 16 and transmits in the direction where the projecting portion 11 is present. The efficiency is increased thereby. The reflecting film 16 is formed on the end face 14, and formed by a method in which metals such as silver and aluminum are vapor deposited or these vapor deposited metals are attached to a PET (poly ethylene terephthalate) resin sheet.

A material of the light transmission plate 1 includes a transparent resin such as an acrylic resin, a polycarbonate resin, and an amorphous polyolefin resin, an inorganic transparent material such as glass, or a composite material thereof.

The projecting portion provided on the light transmission plate 1 has the side surface 12 substantially perpendicular to the plate surface 15a as described above, and the transmitted beam reaches this side surface 12, and then, is emitted from the light transmission plate 1. To illuminate the illuminated object 3, a free shape is available so long as one surface is substantially perpendicular to the plate surface 15a of the light transmission plate 1, and the other surface is substantially parallel thereto. The shape of a columnar surface or a shape similar thereto has no directional anisotropy, and favorable in simultaneously introducing the beam from each direction of the light transmission plate.

In order to form the projecting portion 11 on the transparent light transmission plate 1, a method is employed, in which a film or a resin layer is joined on a transparent resin or a glass plate in addition to the injection molding, a thermosetting resin, a photo-curable resin and etching.

The size of the projecting portion 11 must be at least 5 $\mu$m so as not to be affected by the diffraction since the wavelength of the visible light is approximately 380 nm to 700 nm. The size of the projecting portion 11 is preferably approximately 300 $\mu$m or under so that it is visibly negligible to the naked eye. In addition to the above-described description, the size of the projecting portion 11 is preferably about 1 $\mu$m to 100 $\mu$m or under from the convenience in manufacture.

The organic EL element 2 is formed in the vicinity of the end face 14, and its thickness is at most several $\mu$m. Thus, the light source using this element can be very low profile and reduced in size than the those using a fluorescent tube, a light-emitting diode, etc. for the light source. Further, the organic EL element 2 is of the integrated structure, and the projecting portion 11 can be disposed extremely in the vicinity of the organic EL element 2, and the size of the light source is further reduced.

In general, the light-emitting layer 22 is preferably and functionally separated from the hole transport layer, the organic EL light-emitting film, and the electron transport layer. However, the design of the light-emitting layer 22 is not limited thereto, but a hole injection layer can be introduced between the transparent electrode film 21 and the hole transport layer, or an electron injection layer can be introduced between the reflecting electrode film 23 and the electron transport layer. A trace of fluorescent dye can be introduced in the hole transport layer and the electron transport layer, and the light emitting color can be freely selected by the fluorescent dye to be introduced.

A hole transport material used for the light-emitting layer 22 includes a tetra-allyl benzidine compound (triallyl diamine or tri-phenyl diamine: TPD), the aromatic tertiary amine, the hydrazone derivative, the carbazole derivative, the triazole derivative, the imidazole derivative, the oxa- diazole derivative and the polythiophene. Only one kind or two or more kinds of these compounds may be jointly used.

For the electron carrying compounds, the quinoline derivative, the metal complex with 8-quinolinol and its derivative for the ligand, in particular, tris (8-quinolinolate) aluminum (Alq3) is preferably used. Further, the phenyl anthracene derivative, and the tetra-allyl ethene derivative are preferably used. The oxyadiazole derivative, the perylene derivative, the pyridine derivative, the pyrimidine derivative, the quinoxaline derivative, the diphenyl quinone derivative, the nitro-substituted fluorene derivative, etc. can also be used. Only one kind or two or more kinds of these compounds may be jointly used. Many of these compounds function as an effective light-emitting material.

In forming the organic EL light emitting film, various film forming methods can be selected, such as vacuum vapor deposition, sputtering, spin coat, dipping, and ink jet system irrespective of the monomer or the polymer.

Any material is acceptable for the reflecting electrode film 23 so long as it is electrically conductive. For example, it includes a single metal such as Al, Ti, Ta, K, Li, Na, Mg, La, Ce, Ca, Sr, Ba, Ag, In, Sn, Zn and Zr, or two-component or three-component alloy containing these single metals. In particular, Al is preferable for the single metal, and the Mg-Ag alloy, and Al alloy are preferable for the alloy.

The thickness of the transparent electrode film 21 is generally 1 to 500 nm. In particular, the thickness is preferably in a range of 50 to 300 nm. The thickness of the hole injection electrode is 50 to 500 nm, in particular, preferably in a range of 50 to 300 nm. Its upper limit is not specified; however, when it is too large, the transmissivity can be reduced, or peeling can be generated. On the contrary, if the thickness is too small, no sufficient effect as the electrode can be obtained, or there raises a problem in the strength of the film during the manufacture.

The thickness of the light-emitting layer 22 is not limited, and it is generally 5 to 500 nm, in particular, preferably 10 to 300 nm.

In the above-described constitution, the illumination device is disposed on the front side of the illuminated object 3, and capable of realizing the part time illumination in which the illuminated object 3 is observed by extinguishing the illumination when it is light with the sufficient external light, and the illuminated object 3 can be observed by lighting the illumination when it is dark with insufficient external light. The above-described illumination device is of the front light type, and a print on the paper, etc., a liquid crystal display device, etc. are suitable for the illuminated object 3.

Second Exemplary Embodiment

Figure 2:
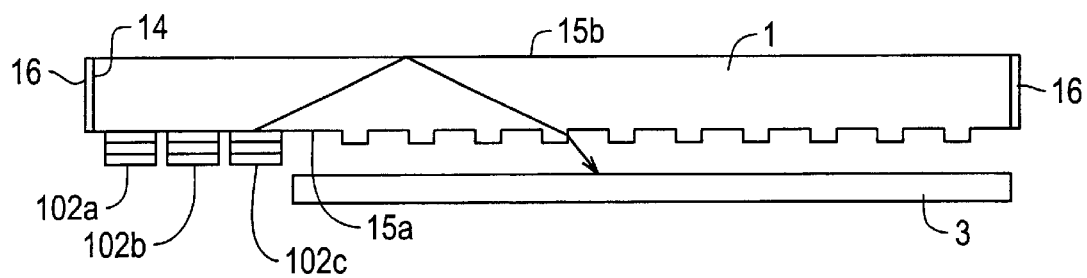
FIG. 2 is a sectional view of a structure of an illumination device according to a second exemplary embodiment of the present invention.

A second exemplary embodiment of the present invention is described below with reference to the drawings. FIG. 2 is a sectional view of the constitution of an illumination device of the second embodiment of the present invention. In the figure, a plurality of organic EL elements 102a–102c are formed on a plate surface 15a of a light transmission plate 1. For example, it is possible to obtain the white light by forming the organic EL elements 102a–102c having red, green and blue light-emitting colors.

Third Exemplary Embodiment

Figure 3:
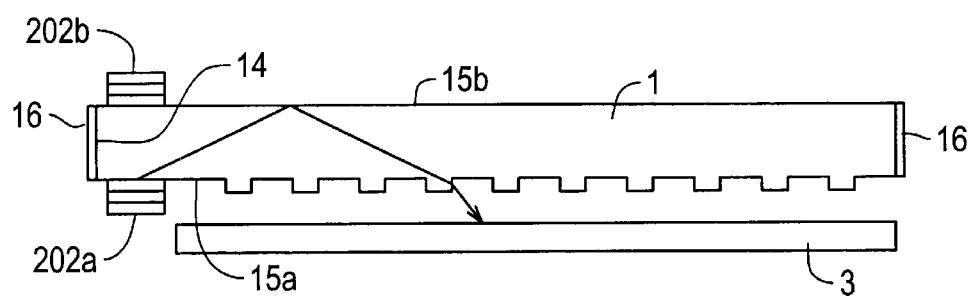
FIG. 3 is a sectional view of a structure of an illumination device according to a third exemplary embodiment of the present invention.

A third exemplary embodiment of the present invention is described below with reference to the drawings. FIG. 3 is a sectional view of the constitution of an illumination device of the third embodiment of the present invention. In the figure, an organic EL element is respectively provided on both main surfaces of a light transmission plate 1. This means that an organic EL element 202a is formed on a plate surface 15a which is the main surface on the light emission side, and an organic EL element 202b is formed on a plate surface 15b which is the main surface on the counter light emission side. The illumination efficiency can be further increased by employing this constitution.

Fourth Exemplary Embodiment

Figure 4:
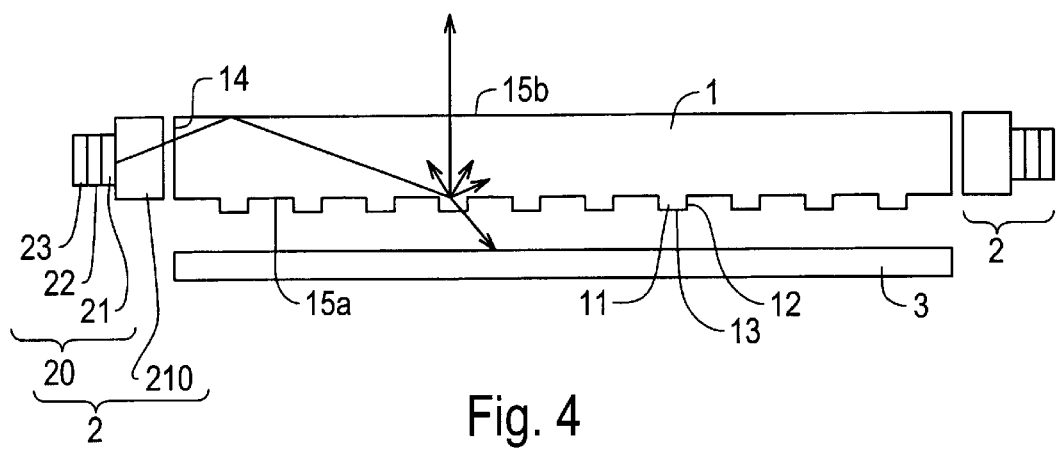
FIG. 4 is a sectional view of a structure of an illumination device according to a fourth exemplary embodiment of the present invention.
Figure 5:
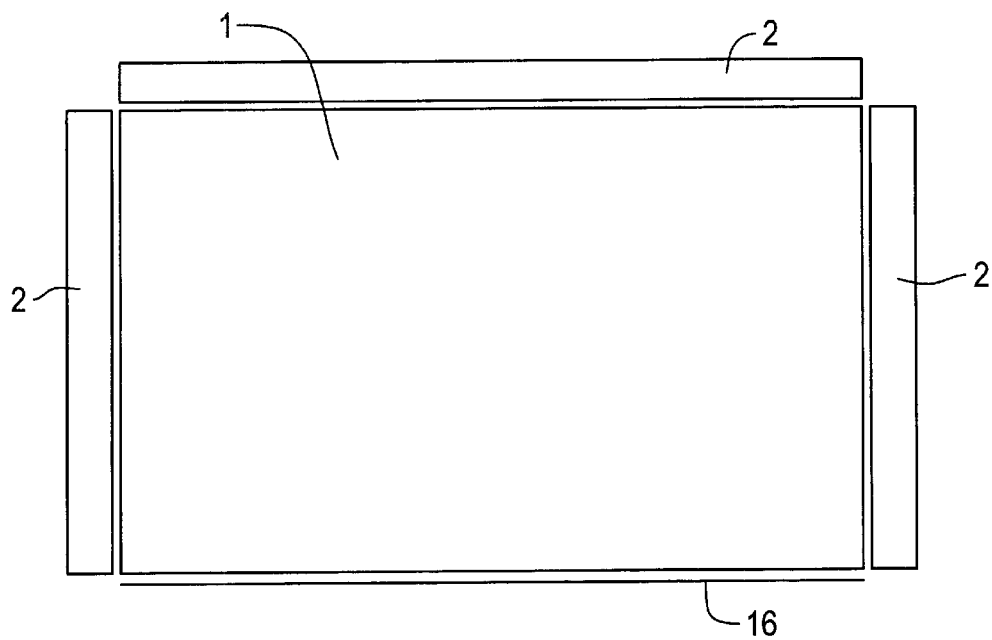
FIG. 5 is a plan view of a structure of an illumination device according to the fourth exemplary embodiment of the present invention.

A fourth exemplary embodiment of the present invention is described below with reference to the drawings. FIG. 4 is a sectional view of the constitution of an illumination device of the fourth embodiment of the present invention, and FIG. 5 is a plan view thereof. In FIGS. 4 and 5, an organic EL light source 2 is disposed adjacent to an end face 14 of a transparent light transmission plate 1. The organic EL light source 2 has a constitution that an organic EL element 20 is formed on a substrate 210. The organic EL element 20 may consist of a transparent electrode film 21, a light-emitting layer 22 and a reflecting electrode film 23 from the substrate 210 side. Though the light-emitting layer 22 is depicted in a simplified manner, it may actually consist of a plurality of layers including a hole transport layer, an organic EL light emitting film, and an electron transport layer.

The transparent electrode film 21 is an electrode on the side from which the light is taken, and formed of ITO (Indium Tin-doped Oxide), etc., and IZO (Indium Zinc-doped Oxide), ZnO, etc. can also be used.

In general, the light-emitting layer 22 is preferably and functionally separated from the hole transport layer, the organic EL light emitting film, and the electron transport layer. However, the design is not limited thereto, and a hole injection layer can be introduced between the transparent electrode film 21 and the hole transport layer, or a very thin insulation layer can be introduced for an electron injection layer between the reflecting electrode film 23 and the electron transport layer. A trace of fluorescent dye can be introduced in the hole transport layer and the electron transport layer, and the light emitting color can be freely selected by the fluorescent dye to be introduced.

A hole transport material used for the light-emitting layer 22 includes a tetra-allyl benzidine compound (tri allyl diamine or tri-phenyl diamine: TPD).

For the electron carrying compounds, the quinoline derivative, the metal complex with 8-quinolinol and its derivative for the ligand, in particular, tris (8-quinolinolate) aluminum (Alq3) is preferably used.

In forming the organic EL light emitting film, various film forming methods can be selected, such as vacuum vapor deposition, sputtering, spin coat, dipping, and ink jet system irrespective of the monomer or the polymer.

Any material is acceptable for the reflecting electrode film 23 so long as it is electrically conductive. In particular, Al is preferable for the single metal, and the Mg—Ag alloy, and Al alloy are preferable for the alloy.

The thickness of the transparent electrode film 21 is generally 1 to 500 nm. In particular, the thickness is preferably in a range of 50 to 300 nm. The thickness of the hole injection electrode is 50 to 500 nm, in particular, preferably in a range of 50 to 300 nm. Its upper limit is not specified; however, when it is too large, the transmissivity can be reduced, or peeling can be generated. On the contrary, if the thickness is too small, no sufficient effect as the electrode can be obtained, or there raises a problem in the strength of the film during the manufacture.

The thickness of the light-emitting layer 22 is not limited, and it is generally 5 to 500 nm, in particular, preferably 10 to 300 nm.

A projecting portion 11 having an uneven shape for light diffusion is provided on one plate surface 15a of the light transmission plate 1. This projecting portion 11 may consist of a side surface 12 perpendicular to the plate surface 15a of, for example, the light transmission plate 1, and a bottom surface 13 horizontal to the plate surface 15b. In the figure, the path of an arbitrary light beam in the light guide plate 1 is indicated by an arrow. When the light beam emitted from the organic EL element 2 reaches the plate surface 15b of the light transmission plate 1 at the angle of not less than the critical angle, the light beam is subjected to the total reflection, and transmits in the light transmission plate, and can be outside the light transmission plate 1 when this beam reaches the side surface 12 of the projecting portion 11 at the angle of not more than the critical angle. This means that more light is emitted from a reverse side of the illumination device, and an illuminated object 3 can be effectively illuminated.

A reflecting film 16 is disposed adjacent to a part on which no organic EL light source is disposed out of an end face 14 of the light transmission plate 1. The light beam reaching a plate surface 15 of the light guide plate 1 at the angle not more than the critical angle out of the light beam emitted from the organic EL light source 20 does not contribute to the light transmission, and the ratio of this light beam is about 20% of the total. About one half of the remaining light beam transmits in the direction where the projecting portion 11 formed on the plate surface 15 is present, and the remaining half of the remaining light beam transmits in the direction opposite thereto. This is reflected by the reflecting film 16 and transmits in the direction where the projecting portion 11 is present. The efficiency is increased thereby. The reflecting film 16 is formed on the end face 14. The reflecting film 16 is formed by a method in which metals such as silver and aluminum are vapor deposited or these vapor deposited metals are attached to a PET resin sheet.

A material of the light transmission plate 1 includes a transparent resin such as an acrylic resin, a polycarbonate resin, and an amorphous polyolefin resin, an inorganic transparent material such as glass, or a composite material thereof.

The projecting portion 11 provided on the light transmission plate 1 has the side surface 12 substantially perpendicular to the plate surface 15a as described above, and the transmitted beam reaches this side surface 12, and then, is emitted from the light transmission plate 1. To illuminate the illuminated object 3, a free shape is available so long as one surface is substantially perpendicular to the plate surface 15a of the light transmission plate 1, and the other surface is substantially parallel thereto. Since the shape of a columnar surface or a shape similar thereto has no directional anisotropy, it is favorable in simultaneously introducing the beam from each direction of the light transmission plate.

In order to form the projecting portion 11 on the transparent light transmission plate 1, a method is employed, in which a film or a resin layer is joined on a transparent resin or a glass plate in addition to the injection molding, a thermosetting resin, a photo-curable resin and etching.

The size of the projecting portion 11 must be at least 5 μm so as not to be affected by the diffraction since the wavelength of the visible light is approximately 380 nm to 700 nm. The size of the projecting portion 11 is preferably approximately 300 μm or under so that it is visibly negligible to the naked eye. In addition to the above-described description, the size of the projecting portion 11 is preferably about 1 μm to 100 μm or under from the convenience in manufacture.

With reference to FIGS. 4 and 5, a plurality of organic EL light sources 20 are disposed on a plurality of end faces 14 of the light transmission plate 1 of the device of this example. For example, it is possible to obtain the white light by forming the light sources having red, green and blue light emitting colors.

In the above-described constitution, the illumination device is disposed on the front side of the illuminated object 3, and the illuminated object 3 is observed by extinguishing the illumination when it is light with the sufficient external light, and the illuminated object 3 can be observed by lighting the illumination when it is dark with insufficient external light. A print on the paper, etc., a liquid crystal display device, etc., are suitable for the illuminated object 3 of the above-described illumination device.

Fifth Exemplary Embodiment

Figure 6:
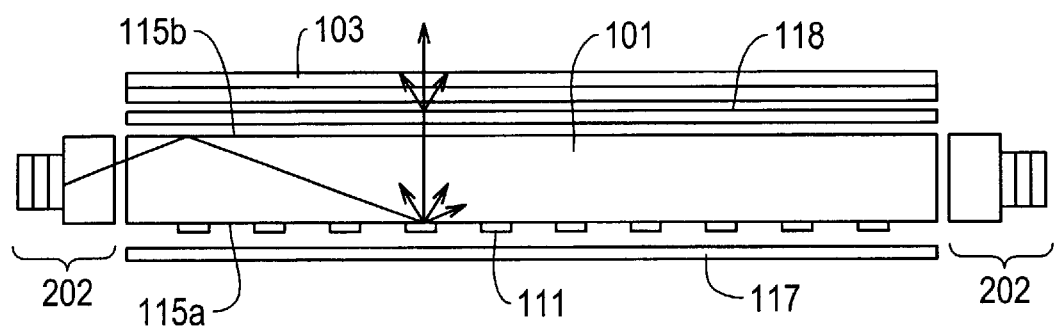
FIG. 6 is a sectional view of a structure of an illumination device according to a fifth exemplary embodiment of the present invention.

The fifth exemplary embodiment of the present invention is described with reference to the drawings. In FIG. 6, the illumination device illuminates an illuminated object 103. A light diffusion portion 111 is provided on a plate surface 115a of a light transmission plate 101. In the figure, a path of an arbitrary light beam in the light transmission plate 101 is indicated by an arrow. When the light beam emitted from the organic EL element 202 reaches a plate surface 115b of the light transmission plate 101 at the angle of not less than the critical angle, the light beam is subjected to the total reflection, and transmits in the light transmission plate, and a part of the light beam can be outside the light transmission plate 101 when this beam reaches a light diffusion portion 111.

A reflecting sheet 117 is disposed adjacent to the plate surface 115a side of the light transmission plate 101. The reflecting sheet 117 is diffused by the light diffusion portion 111, and serves to reflect the light leaking outside of the plate surface 115a side. A diffusion sheet 118 is disposed adjacent to the plate surface 115b on the side opposite to the plate surface 115a of the light transmission plate 101. This diffusion sheet 118 serves to diffuse the light diffused by the light diffusion portion 111.

In the above-described constitution, an illumination device suitable for a liquid crystal display device or the like, higher in efficiency and inexpensive, can be manufactured.

Sixth Exemplary Embodiment

Figure 7:
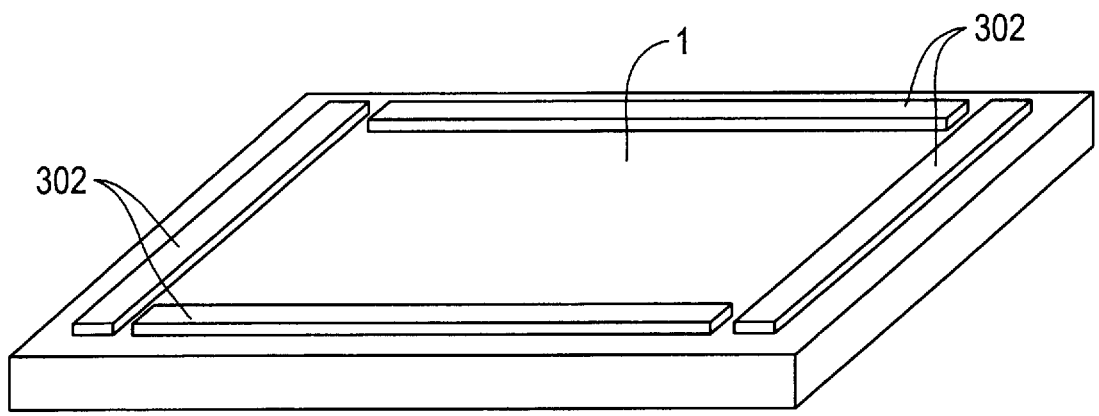
FIG. 7 is a perspective view of a structure of an illumination device according to a sixth exemplary embodiment of the present invention.

The sixth exemplary embodiment of the present invention is described with reference to the drawings. FIG. 7 is a perspective view of an illumination device of the sixth embodiment. This figure shows an example in which an organic EL element 302 is respectively formed on a plurality of end parts (peripheral parts) on the plate surface of the light transmission plate 1. In this constitution, an illumination device higher in efficiency and inexpensive can be manufactured.

In the organic EL elements 302 provided on a plurality of end parts, the light-emitting colors may be different from each other. For example, the desired illumination light can be obtained through the principle of the additive color mixture by disposing a plurality of organic EL elements with red (R), green (G) and blue (B), which are primary colors of the light for the light-emitting colors in a combined manner.

Seventh Exemplary Embodiment

Figure 8:
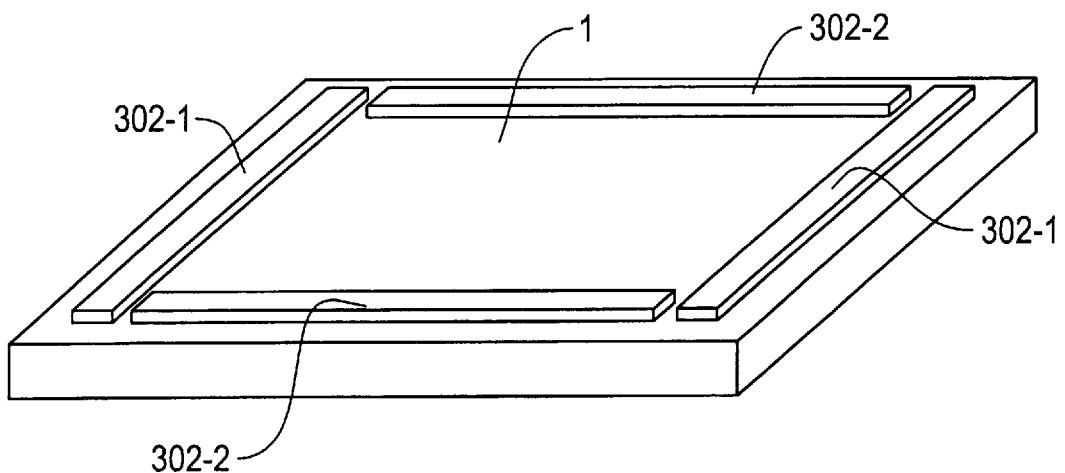
FIG. 8 is a perspective view of a structure of an illumination device according to a seventh exemplary embodiment of the present invention.

The seventh exemplary embodiment of the present invention is described with reference to the drawings. FIG. 8 is a perspective view of an illumination device of the seventh embodiment. As shown in the figure, an illumination device of the present embodiment includes a rectangular light transmission plate 1 and organic EL elements 302-1 and 302-2 provided on end parts of a plate surface of this light transmission plate 1 (in the vicinity of each side of the plate surface). In the present embodiment, the organic EL elements 302-1 opposite to each other on the plate surface emit the light of the same color. Similarly, the organic EL elements 302-2 opposite to each other emit the light of the same color. The uniformity of the light-emitting color can thus be improved by emitting the light of the same color.

Eighth Exemplary Embodiment

Figure 9A:
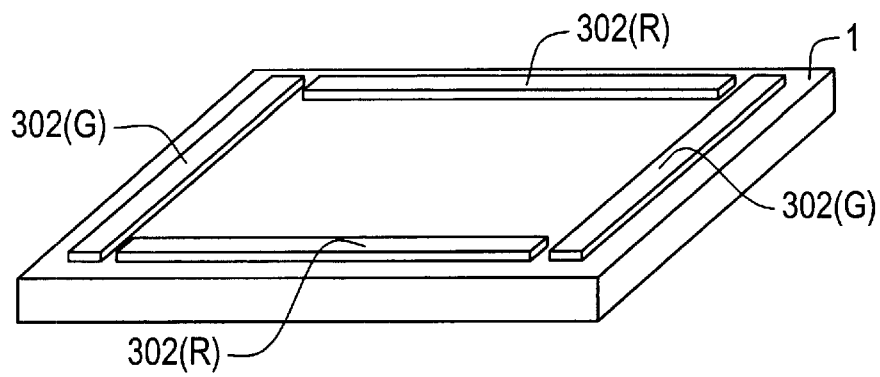
FIGS. 9(a)–(b) are perspective views of a structure of an illumination device according to an eighth exemplary embodiment of the present invention, where
Figure 9B:
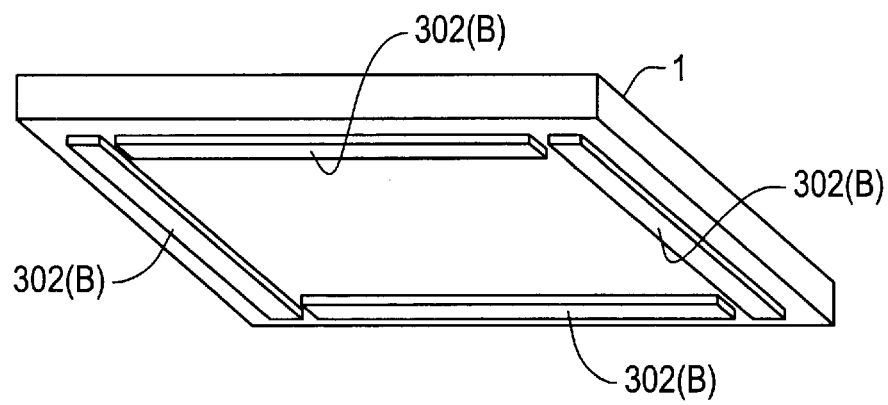

The eighth exemplary embodiment of the present invention is described with reference to the drawings. FIG. 9(a) is a perspective view of a face side of an illumination device of the eighth embodiment, and FIG. 9(b) is a perspective view of a reverse side of the illumination device. In these figures, organic EL elements 302 (R) for emitting the red light are provided on end parts opposite to each other of the plate surface on the face side of the light transmission plate 1, and organic EL elements 302 (G) for emitting the green light are provided on the other end parts opposite to each other of the plate surface.

On the other hand, organic EL elements 302(B) for emitting blue light are respectively provided on four end parts of the plate surface on the reverse side of the light transmission plate 1. The uniform white light can be emitted through the principle of the additive color mixture by disposing the organic EL elements for emitting the red light, the green light and the blue light using both sides of the light transmission plate 1.

Ninth Exemplary Embodiment

Figure 10:
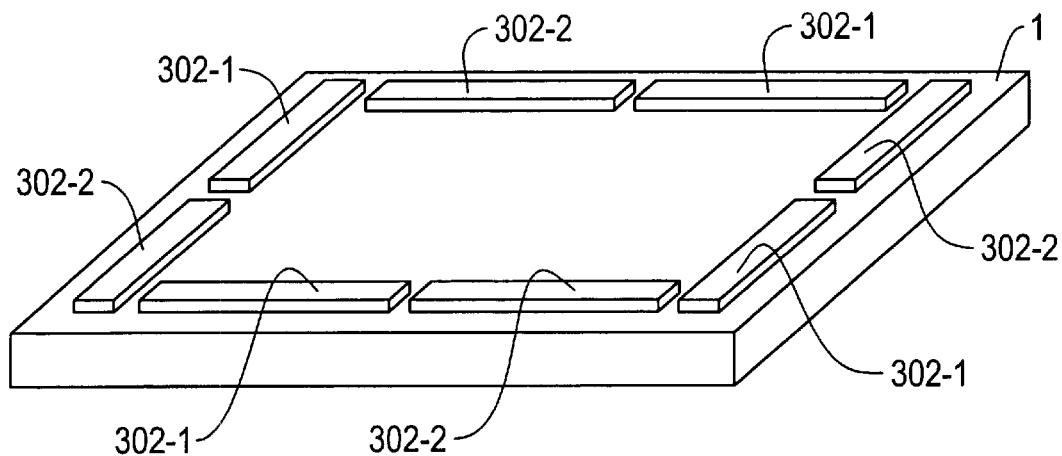
FIG. 10 is a perspective view of a structure of an illumination device according to a ninth exemplary embodiment of the present invention.

The ninth exemplary embodiment of the present invention is described with reference to the drawings. FIG. 10 is a perspective view of an illumination device of the ninth embodiment. In the figure, each two organic EL elements 302-1 and 302-2 different in light-emitting color are disposed on each end part of the light transmission plate 1. The organic EL elements different in light-emitting color may be disposed not only on the face side but also on the reverse side. More uniform white light can be emitted by providing a plurality of light sources different in light-emitting color from each other on the end parts.

Tenth Exemplary Embodiment

Figure 11:
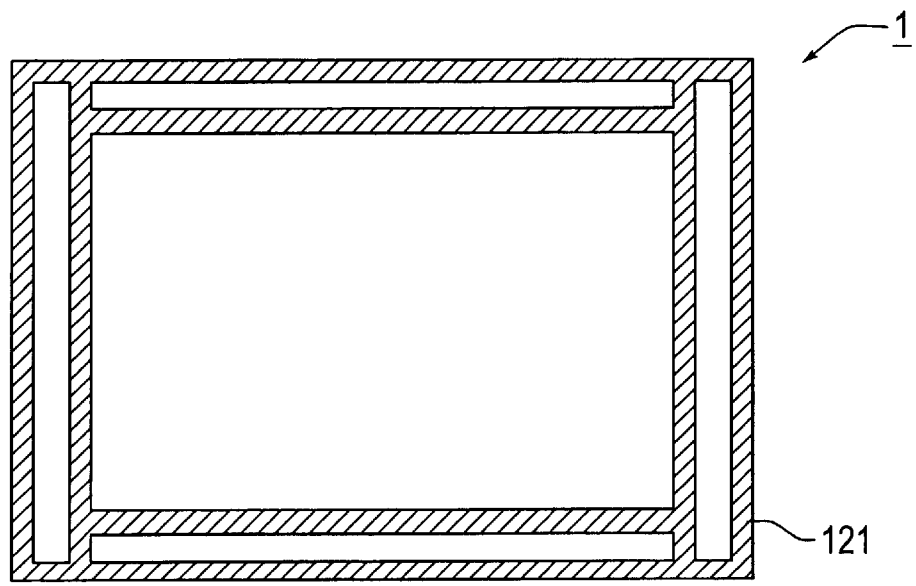
FIG. 11 is a plan view of a structure of an illumination device according to a tenth exemplary embodiment of the present invention.

The tenth exemplary embodiment of the present invention is described with reference to the drawings. FIG. 11 shows a constitution that transparent electrodes are not provided over the whole surface of the light transmission plate 1, but transparent electrodes are provided only on a part except its center portion. This means that, in each embodiment from the above-described FIGS. 8 to 10, the patterning is implemented so that the transparent electrodes 121 are provided only in an area in which the organic EL elements are disposed, and no transparent electrodes are provided in other area. A shadowed part in the figure denotes the thus provided transparent electrodes 121. By implementing the patterning, no transparent electrodes are provided in the center portion of the light transmission plate 1, and the transmissivity and the reflectance of the light can be improved. The transparent electrodes 121 are formed of, for example, ITO.

The light transmissivity of a glass is about 90% while that of a glass with ITO is about 85%. Though the absorptivity of the ITO film itself is about several %, the light from the light source repeats the reflection in the light guide plate, and the attenuation to the reach is large. Thus, by implementing the patterning as described above, no transparent electrodes are provided in the center portion of the light transmission plate, and the transmissivity and the reflectance of the light can be improved.

Eleventh Exemplary Embodiment

Figure 12:
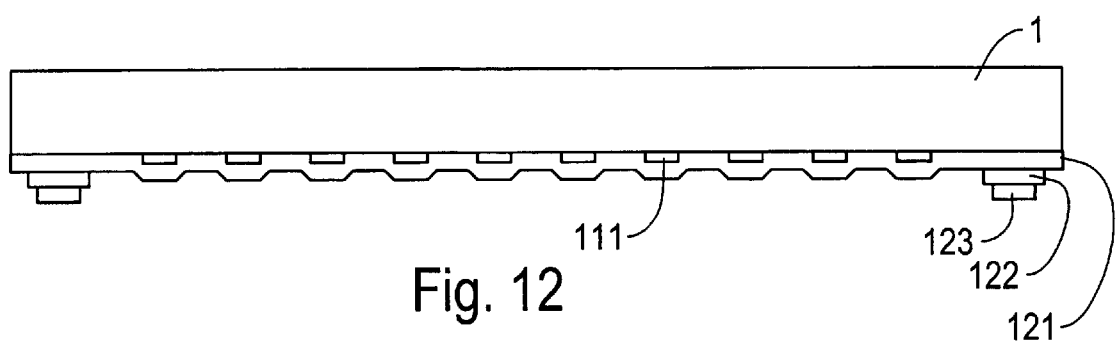
FIG. 12 is a sectional view of a structure of an illumination device according to an eleventh exemplary embodiment of the present invention.

The eleventh exemplary embodiment of the present invention is described with reference to the drawings. FIG. 12 shows a constitution that an illumination device of the back light system is used. The illumination device shown in the figure has light diffusion portions 111, and a transparent electrode 121 is formed to cover the light diffusion portions 111. Organic EL films 122 and cathodes 123 of aluminum, etc. are provided on end parts of the light transmission plate 1 on which the transparent electrode 121 is formed.

The transparent electrode of ITO, etc. is fonned after the pattern of the light diffusion portions 111 is formed. By employing such a constitution, the surface resistance of the ITO can be reduced, and the uniform light can be emitted. The light diffusion portions 111 are formed using a white ink of TiO2, MgO, etc.

The resistivity of the ITO film is $1.26 \times 10^{-4}$ Ωcm, which is larger by two digits than the resistivity of aluminum of $2.67 \times 10^{-6}$ Ωcm. The total resistivity can be reduced, and the uniformity can be increased by forming a film over the whole surface of the light guide plate.

Twelfth Exemplary Embodiment

Figure 13A:
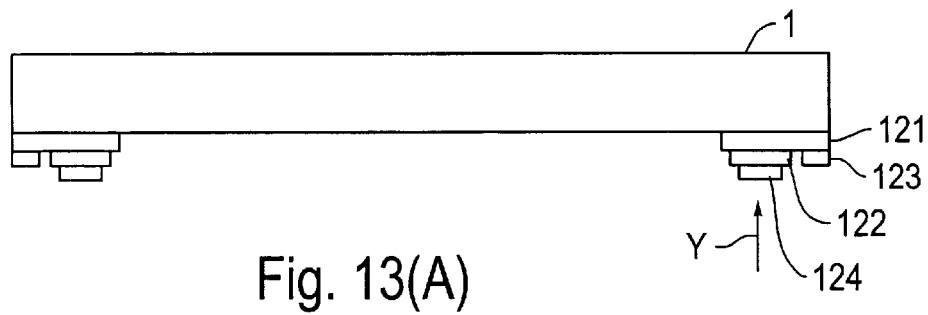
FIGS. 13(a)–(b) are views of a structure of an illumination device according to a twelfth exemplary embodiment of the present invention, where
Figure 13B:
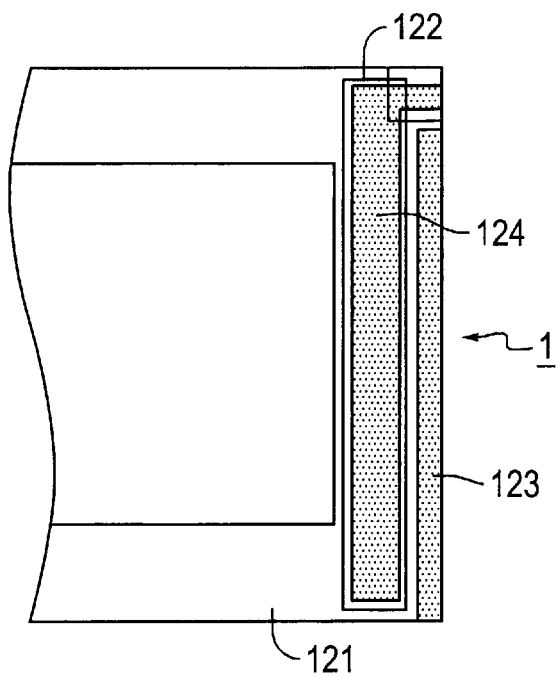
Figure 14:
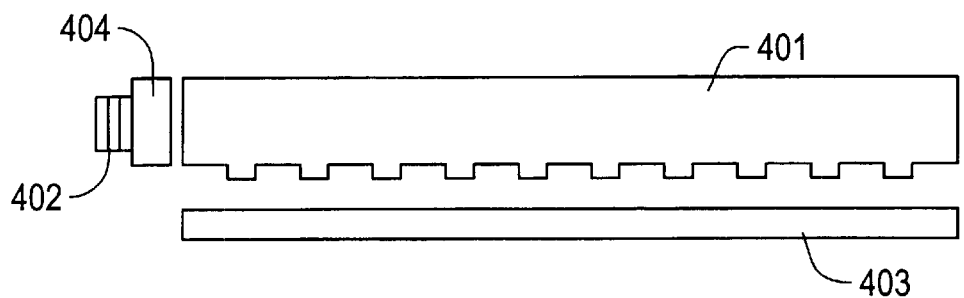
FIG. 14 is a sectional view of the constitution of a related illumination device.

The twelfth exemplary embodiment of the present invention is described below with reference to the drawing. FIGS. 13(a)–(b) show a constitution that an auxiliary electrode of aluminum, etc. is provided in an area not affected by a transparent electrode such as ITO. FIG. 13(a) is a sectional view of a portion of a light transmission plate 1 of an illumination device of the present embodiment, and FIG. 13(b) is a view to show a detailed constitution of a part of a reverse side of the light transmission plate 1 viewed from the direction of an arrow Y in FIG. 13 (a). As shown in these figures, an organic EL film 122 is formed on a transparent electrode 121 of ITO, etc., formed on the reverse side of the light transmission plate 1, and further, an anode 124 of aluminum, etc., is formed thereon. A take-out electrode and a cathode 123 as the auxiliary electrode are provided in an area in which the organic EL film 122 on the transparent electrode 121 is not formed. In such a constitution, the illumination device of the back light system can be realized by emitting the light from the organic EL film 122, making use of the anode 124 and the cathode 123. The organic EL element can be driven more stably by providing the auxiliary electrode on a part not influential on the illumination effect. Since the metal auxiliary electrode low in resistivity is provided in a part not related to the illumination, the resistivity can be reduced, and the uniformity can be improved.

The present invention can further include the following exemplary embodiments.

(1) In an illumination device having an illuminated object and disposed on a front surface of the above-described illuminated object, the above-described illumination device may consist of a transparent light guide plate and a light source on an end face side of the above-described light guide plate, and the above-described light source may consist of an organic electroluminescence element formed on at least one of a light emission side flat surface or a counter light emission side flat surface of the above-described light guide plate.

(2) In the illumination device according to (1) above, uneven-shaped portions may be provided on at least one surface of the above-described light guide plate, the light beam from the above-described light source transmits in the above-described light guide plate, and is diffused by the above-described uneven-shaped portions and emitted from the above-described light guide plate, illuminates the above-described illuminated object, and is reflected thereby, and transmits in and is emitted from the above-described light guide plate.

(3) In the illumination device according to (1) above, a reflecting film may be formed or disposed on the above-described end face part of the above-described light guide plate.

(4) In the illumination device according to (2) above, a reflecting film may be formed or disposed on the above-described end face part of the above-described light guide plate.

(5) In the illumination device according to (2) or (4) above, the above-described uneven-shaped portion may consist of a light emission side flat surface of the above-described light guide plate, a surface in the direction parallel to the above-described light emission side flat surface, and a surface in the direction perpendicular to the above-described light emission side surface.

(6) In the illumination device on which a light source having an organic electroluminescence element is disposed adjacent to an end face of a light transmission plate of the structure with the light diffusibility, the above-described light sources of different color are disposed on at least two parts of the above-described end face.

(7) In the illumination device according to (6), the light emitting colors of the above-described light sources are three colors of red, green and blue.

[Advantages]

As described above, the present invention has the advantages that a low profile surface type illumination device which is highly efficient, reduced in weight and size, excellent in visibility, and disposed on a face side or a reverse side of the illuminated object by forming an organic EL element on a main surface of a light guide plate, or allowing the light incident thereon from a plurality of directions of the light guide plate.

What is claimed is:

1. An illumination device, comprising:
    a light guide plate; and
    a light source provided adjacent to said light guide plate that illuminates an illuminated object by the light emitted from said light guide plate, said light source being an organic electroluminescence element formed on at least one surface of a light emission side main surface and a counter light emission side main surface of said light guide plate, wherein a light emitted from the organic electroluminescence element radiates the light guide plate.

2. The illumination device according to claim 1, further comprising uneven-shaped portions for light diffusion provided on said light guide plate, the light from said light source transmitting in said light guide plate, is diffused in a part of said uneven-shaped portions and illuminating said illuminated object, and reflected light from said illuminated object transmitting in said light guide plate and being emitted therefrom.

3. The illumination device according to claim 2, further comprising a light reflecting part provided on an end face of said light guide plate.

4. The illumination device according to claim 2, said uneven-shaped portion comprising a light emission side main surface of said light guide plate, a surface substantially parallel to said light emission side main surface, and surfaces substantially perpendicular to said light emission side main surface.

5. The illumination device according to claim 1, said illuminated object being a display device, and a front side of a display surface of the display device being illuminated.

6. An illumination device, comprising:

a transparent light guide plate; and a light source provided on said light guide plate and illuminating an illuminated object by the light emitted from said light guide plate, said light source comprising an organic electroluminescence element and being provided on at least one of a plurality of end parts that extend along edges of main surfaces of said light guide plate so as to not completely cover any of the main surfaces.

7. The illumination device according to claim 6, further comprising light sources different in light emitting color from each other disposed on at least two end parts out of a plurality of said end parts.

8. The illumination device according to claim 6, at least one of the main surfaces of said light guide plate being substantially rectangular, and light sources of same light emitting color being respectively disposed on end parts opposite thereto.

9. The illumination device according to claim 6, further comprising light sources of three colors different in light emitting color respectively disposed on a plurality of end parts of both main surfaces of said light guide plate.

10. The illumination device according to claim 6, further comprising a plurality of light sources different in light emitting color from each other provided on said end parts.

11. The illumination device according to claim 6, further comprising a transparent electrode for driving said light source provided only in a vicinity of an end part on which said light source is provided in the main surfaces of said light guide plate.

12. The illumination device according to claim 6, said light guide plate further comprising uneven-shaped portions for light diffusion provided on at least one of said main surfaces, and a transparent electrode that drives the light source provided and that covers said uneven-shaped portions.

13. The illumination device according to claim 12, further comprising an auxiliary electrode provided in an area other than an area provided with said unevenshaped portions, and electrically connected to said transparent electrode to supply power to said transparent electrode.

14. The illumination device according to claim 6, said illuminated object being a display device and having a display surface comprising an illuminated reverse side.

15. A display apparatus, comprising:

a display device;

a light guide plate; and a light source provided adjacent to said light guide plate that illuminates the display device by light emitted from said light guide plate, said light source being an organic electroluminesence element formed on at least one surface of a light emission side main surface and a counter light emission side main surface of said light guide plate, light emitted from the organic electroluminescence element radiating the light guide plate.

16. A display apparatus, comprising:

a display device;

a transparent light guide plate; and a light source provided on said light guide plate that illuminates the display device by light emitted from said light guide plate, said light source including an organic electroluminesence element and being provided on at least one of a plurality of end parts that extend along edges of main surfaces of said light guide plate so as to not completely cover any of the main surfaces.

* * * * *